United States Patent [19]
Takeda et al.

[11] Patent Number: 5,698,118
[45] Date of Patent: Dec. 16, 1997

[54] FLASH WELDING APPARATUS

[75] Inventors: Akimichi Takeda; Junji Miyata; Masaru Yoshida, all of Tokyo, Japan

[73] Assignee: Mitsubishi Denki Kabushiki Kaisha, Tokyo, Japan

[21] Appl. No.: 748,408

[22] Filed: Nov. 13, 1996

[30] Foreign Application Priority Data

Mar. 29, 1996 [JP] Japan ..................................... 8-076319

[51] Int. Cl.⁶ .................................................. B23K 11/04
[52] U.S. Cl. .................................. 219/97; 219/105
[58] Field of Search ........................ 219/97, 100, 101, 219/104, 105

[56] References Cited

U.S. PATENT DOCUMENTS

| | | | |
|---|---|---|---|
| 4,626,647 | 12/1986 | Takeda et al. | 219/101 |
| 5,030,313 | 7/1991 | Takeda et al. | 219/105 |

FOREIGN PATENT DOCUMENTS

| | | | |
|---|---|---|---|
| 2-24546 | 7/1990 | Japan. | |
| 2-93085 | 7/1990 | Japan. | |
| 3-31511 | 7/1991 | Japan. | |

*Primary Examiner*—Clifford C. Shaw
*Attorney, Agent, or Firm*—Burns, Doane, Swecker & Mathis, LLP

[57] ABSTRACT

A flash welding machine is capable of cutting ends of a pair of preceding and following weld members 1, 2 by means of a shear device 26, 27 and then flash welding them with each other. The flash welding machine can coat an appropriate amount of combustible fluid on the cut end surfaces of the weld members 1, 2. When a first end sensor 31 and a second end sensor 31 sense widthwise leading ends of the weld members 1, 2, a first and a second nozzle 35, 36 start coating the combustible fluid on the cut end surfaces of the weld members 1, 2 from the widthwise leading ends of the weld meets 1, 2. The nozzles 35, 36 stop coating when either one of the sensors 31, 33 senses a widthwise trailing end of one of the weld members 1, 2. Thus, it becomes possible to coat the combustible fluid on the cut ends of the weld members 1, 2 over an area extending from the widthwise leading end to the widthwise trailing end thereof.

8 Claims, 11 Drawing Sheets

FIG. 4

| COATING TABLE FOR COMBUSTIBLE FLUID |||
|---|---|---|
| MATERIAL | COATING | AMOUNT OF COATING |
| LOW CARBON STEEL | NO | 0 |
| HIGH CARBON STEEL | NO | 0 |
| SILICON STEEL Si CONTENT LESS THAN 0.5% | NO | 0 |
| SILICON STEEL Si CONTENT 0.5~1.5% | YES | THICKNESS LESS THAN 3mm 2cc/100mm |
| | | THICKNESS EQUAL TO OR GREATER THAN 3mm 4cc/100mm |

FLASH WELDING APPARATUS

BACKGROUND OF THE INVENTION

1. Field of the Invention

The present invention relates to a flash welding apparatus in which members to be welded are coated at cut end surfaces thereof with a combustible fluid before their welding and then subjected to welding in an irrespirable (oxygen lacking) atmosphere.

2. Description of the Related Art

A typical example of a conventional welding machine disclosed in Japanese Utility Model Laid-Open No. 2-24546 is illustrated in FIG. 11. In this figure, the conventional welding machine illustrated comprises a pair of first and second members 1, 2 to be welded (hereinafter referred to as weld members) which are disposed at positions opposing to each other with a predetermined space formed therebetween, a pair of first and second electrodes 3, 4 for supporting lower surfaces of the first and second weld members 1, 2 and for supplying these members with a welding current, and a pair of first and second clamp members 5, 6 provided on upper surfaces of the first and second weld members 1, 2 for clampingly supporting the in cooperation with the first and second electrodes 3, 4.

Provision is made for a pair of rotary shears 7, 7 which comprise a pair of shear bodies 8, 8 disposed between the first and second weld members 1, 2 at a predetermined space formed therebetween, a pair of rotating blades 9, 10; 9, 10 mounted on a pair of rotating shafts which are disposed at a predetermined space formed therebetween, a pair of tanks 11, 11 each mounted on an upper portion of the corresponding shear body 8 for storing a combustible fluid in the form of an oil therein, and a pair of connecting pipes 12, 12 each connected at their one end to the corresponding tank 11 and opening at their other end to a cut portion of the corresponding weld member 1, 2 in a face-to-face relation with respect thereto. A pair of pumps 13, 13 are disposed on the corresponding connecting pipes 12, 12, respectively, and operatively connected with the rotary shafts of the corresponding rotary shear bodies 8, 8, respectively, so that they are driven in conjunction with a cutting operation of the corresponding rotary shears 7, 7.

Now, the operation of the conventional flash welding machine as constructed above will be described in detail below.

First, the weld members 1, 2 are transported to predetermined positions as illustrated in FIG. 11 and they are appropriately disposed there and clamped in positions by means of the pair of electrodes 3, 4 and the pair of clamps 5, 6. Then, the rotary shears 7, 7 are each moved from one widthwise end of the corresponding weld members 1, 2 to the other end thereof in its widthwise direction to cause the rotary shafts of the rotary shear bodies 8, 8 to rotate, so that the rotary shear blades 9, 10; 9, 10 are driven to rotate, thus cutting the end portions 1a, 2a of the weld members 1, 2. In conjunction with the rotation of the rotation shafts of the rotary shear bodies 8, 8, the pumps 13, 13 are driven to operate so that the oil in the tanks 11, 11 is thereby extracted or drawn to be supplied through the connecting pipes 12, 12 to the weld members 1, 2 so as to be coated on the cut end surfaces thereof.

The rotary shears 7, 7 are returned to their original positions after cutting of the weld members 1, 2 has been finished. Subsequently, current is supplied to the electrodes 3, 4 and the second weld member 2 is clamped by the second electrode 4 and the second clamp 6 and moved by them toward the first weld member 1 so that the cut end surfaces of the first and second weld members 1, 2 are made into abutting engagement with each other. The cut ends of these weld members 1, 2 are melted by sparking generated by welding current, thus causing the oil coated on the cut ends of the weld members 1, 2 to burn. This gives rise to an irrespirable atmosphere in which the weld members 1, 2 are to be flash welded with each other.

With the conventional flash welding machine as constructed above, after the weld members 1, 2 are relatively moved into and chewed by the pair of circular rotary blades 9, 10; 9, 10, the pumps 3, 13 are driven to operate so that oil is supplied to and coated on the cut end surfaces of the weld members 1, 2. Accordingly, when the next or second cutting begins after the completion of the first cutting, there develops a situation that the connecting pipes 12, 12 are not fully filled with oil because the oil in the connecting pipes 12, 12 drops naturally, as a result of which it is impossible to coat oil over the entire surfaces of the cut ends of the weld members 1, 2 (i.e., from the widthwise leading end to the widthwise trailing end) throughout the whole period from the beginning to the end of the cutting operation.

Moreover, since the pumps 13, 13 are driven to operate in conjunction with the rotation of the rotation shafts of the bodies 8, 8 of the rotary shears 7, 7 to thereby apply oil to the cut end surfaces of the weld members 1, 2, there arises a problem that oil is always coated on the cut end surfaces of the weld members which are to be flash welded to each other by means of the flash welding machine, even if the weld members are formed of a material such as low-carbon steel requiring no oil coating at the cut end surfaces thereof.

SUMMARY OF THE INVENTION

The present invention is intended to obviate the above-mentioned problems and has for its object the prevision of a novel and improved welding machine of the type described in which a combustible fluid is coated over end surfaces of members to be welded from a widthwise leading end to a widthwise trailing end thereof, and which can determine, on the basis of the kind or thickness of a material for the members to be welded, whether a combustible fluid is to be coated on the cut end surfaces of the weld members, while adjusting the amount of the combustible fluid to be coated if coating is required.

Bearing the above object in mind, according to the present invention, there is provided a flash welding machine comprising:

shear means for cutting an end of each of a pair of preceding and following weld members, each of the weld members having a widthwise leading end and a widthwise trailing end;

sensor means for sensing a widthwise leading end and a widthwise trailing end of each of the weld members; and coating means for coating a combustible fluid on the cut ends of the weld members, the coating means being adapted to start coating from the widthwise leading ends of the weld members when the sensor means senses the widthwise leading ends of the weld members, and stop coating when the sensor means senses the widthwise trailing ends of the weld members.

In a preferred form of the invention, the coating means comprises a nozzle provided for each weld member and movable in a widthwise direction of the corresponding weld member, and wherein the sensor means comprises an end sensor provided for each weld member and disposed integrally with the nozzle at a location forwardly of the corresponding nozzle in a direction in which the nozzle moves in the widthwise direction of the corresponding weld member.

In another preferred form of the invention, the coating means and the sensor means are mounted on the shear means.

In a further preferred form of the invention, the shear means, the sensor means and the coating means are utilized in common for the weld members.

In a preferred form of the invention, the combustible fluid comprises grease.

In a preferred form of the invention, the sensor means comprises:

a first sensor for sensing the leading and trailing ends of the weld members; and a second sensor for sensing the leading and trailing ends of the weld members;

wherein the coating means is operable to start coating the combustible fluid on the cut surfaces of the weld members when both of the first and second sensors sense the widthwise trailing ends of the weld members, and stop coating when either one of the first and second sensors senses the widthwise trailing end of one of the weld members.

In a preferred form of the invention, provision is made for control means which determines, based on information about the kind or thickness of a material of the weld members input thereto, whether coating of a combustible fluid is required for the material.

in a preferred form of the invention, the control means adjusts an amount of combustible fluid to be coated on the basis of the material kind or thickness information input thereto.

The above and other objects, features and advantages of the present invention will become more readily apparent from the following detailed description of a few preferred embodiments of the invention taken in conjunction with the accompanying drawings.

BRIEF DESCRIPTION OF THE DRAWINGS

FIG. 4 is a table showing the use of coatings for different materials.

DESCRIPTION OF THE PREFERRED EMBODIMENTS

Now, preferred embodiments of the present invention will be described in detail while referring to the accompanying drawings.

EMBODIMENT 1

Figure 1:
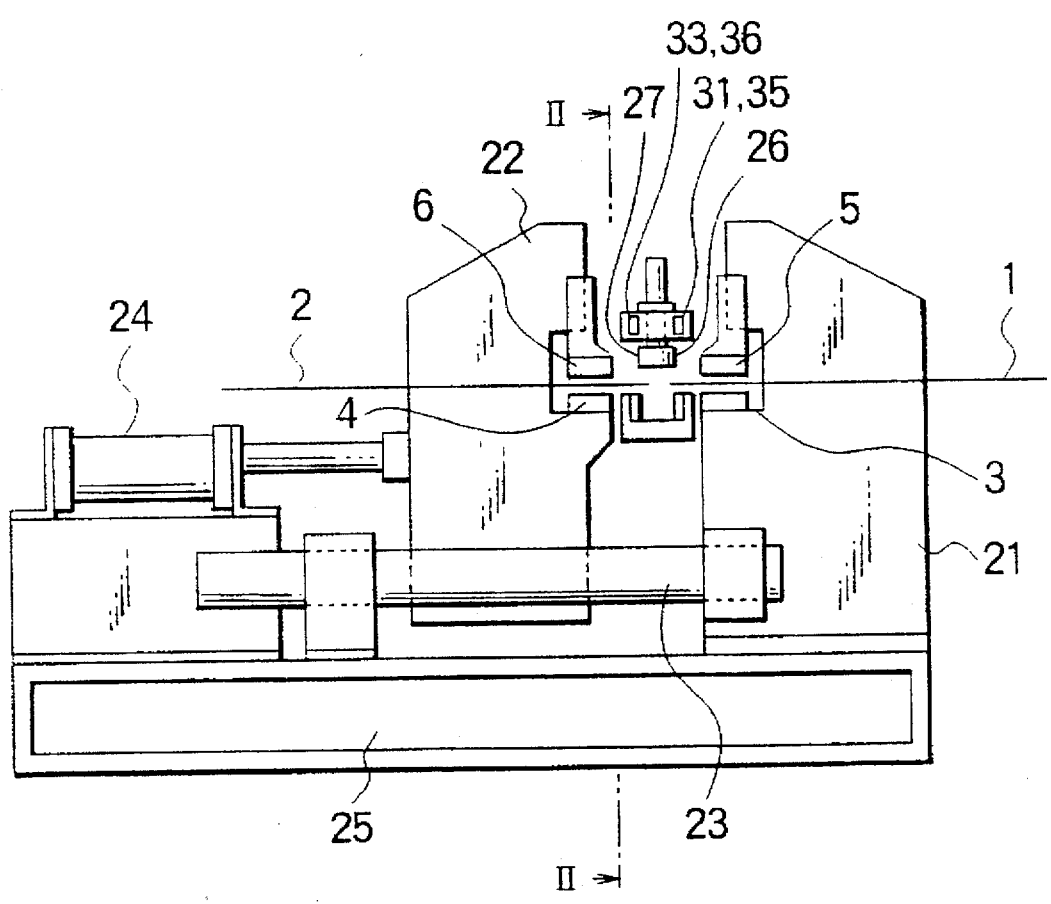
FIG. 1 is a view showing the construction of a flash welding machine using a pair of guillotine shears in accordance with the first embodiment of the present invention.
Figure 2:
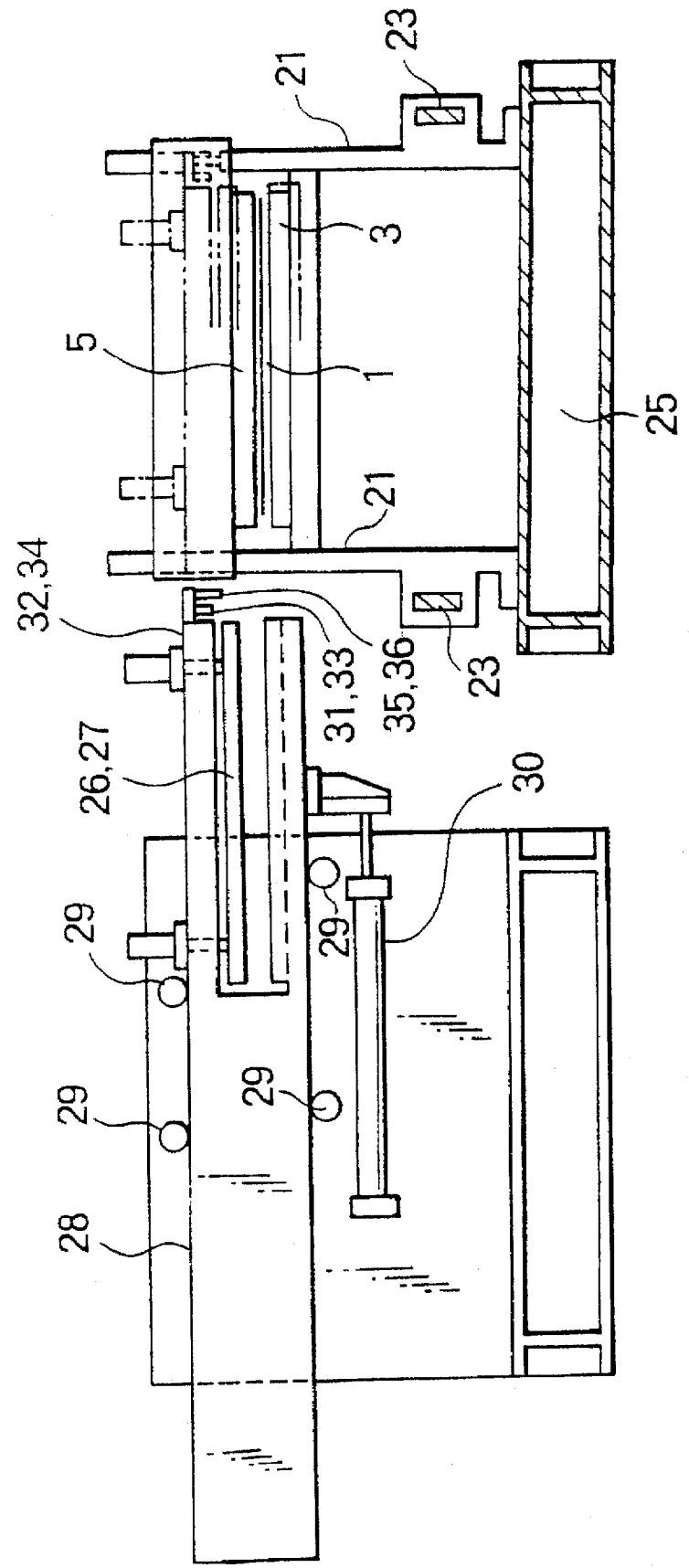
FIG. 2 is a cross sectional view taken along line IS—IS of FIG. 1.

FIGS. 1 and 2 illustrate a flash welding machine using a pair of guillotine shears constructed in accordance with a first embodiment of the present invention. In these figures, reference numerals 1, 2 designate a first or preceding weld member and a second or following weld member 2, respectively, transported to predetermined positions and held there with their adjacent ends opposing to each other at a predetermined distance therebetween, the adjacent ends of the weld members being adapted to be cut in a later stage. The weld members 1, 2 are formed of silicon steel, special or alloyed steel, etc. The weld members 1, 2 are supported at their undersides by a first electrode 3 and a second electrode 4, respectively, which serve to supply welding current to these weld members. A first clamp 5 and a second clamp 6 are respectively disposed above the upper surfaces of the weld members 1, 2 for clamping these weld members in cooperation with the first and second electrodes 3, 4. The first clamp 5 is movable in a vertical direction under the guidance of a pair of fixed supports 21, 21. The second clamp 6 is also movable in a vertical direction under the guidance of a pair of movable supports 22, 22 (only one is illustrated). The movable supports 22, 22 are supported by guide plates 23, 23, respectively, and they are driven to move back and forth, i.e., toward and away from the fixed supports 21, 21 by means of a cylinder 24. These fixed supports 21, 21, the movable supports 22, 22, the guide plates 23, 23, and the cylinder 24 are all supported on a common base 25.

An exit guillotine shear 26 and an entrance guillotine shear 27 each having a pair of upper and lower blades are held by a carriage 28 and moved back and forth by means of a cylinder 30 under the guiding action of guides 29 in the form of guide rollers. In this regard, the direction of back-and-forth movement of the carriage 28 is a direction perpendicular to the longitudinal direction of the weld members 1, 2, i.e., in the widthwise direction thereof.

A first or widthwise tailing-end sensor 31 is mounted on a tip end of a first support arm 32 of the exit guillotine shear 26 so as to be movable in the widthwise direction of the preceding weld member 1 along the cut end surface thereof for sensing a widthwise leading edge and a widthwise trailing edge of the weld members 1, 2, as shown in FIGS. 1 and 2. A second or widthwise leading-end sensor 33 is also mounted on a tip end of a second support arm 34 of the entrance guillotine shear 27 so as to be movable along the cut end surface of the following weld member 2 in the widthwise direction thereof.

A first nozzle 35 of a combustible fluid coating system to be described later for coating of a combustible fluid is mounted on the tip portion of the support arm 32 integrally with the first or tailing-end sensor 31, as shown in FIGS. 1 and 2, so as to be movable along the cut tailing-end surface of the preceding weld member 1 in its widthwise direction. In this case, the first sensor 31 and the first nozzle 35 are sequentially mounted on the first support arm 32 in this order in a direction toward the tip end thereof. A second nozzle 36 of the combustible fluid coating system is also mounted on the tip portion of the second support arm 34 integrally with the second or leading-end sensor 33 so as to be movable along the cut leading-end surface of the following weld member 2 in its widthwise direction. In this case, the second sensor 33 and the second nozzle 36 are sequentially mounted on the second support arm 34 in this order in a direction toward the tip end thereof.

Figure 3:
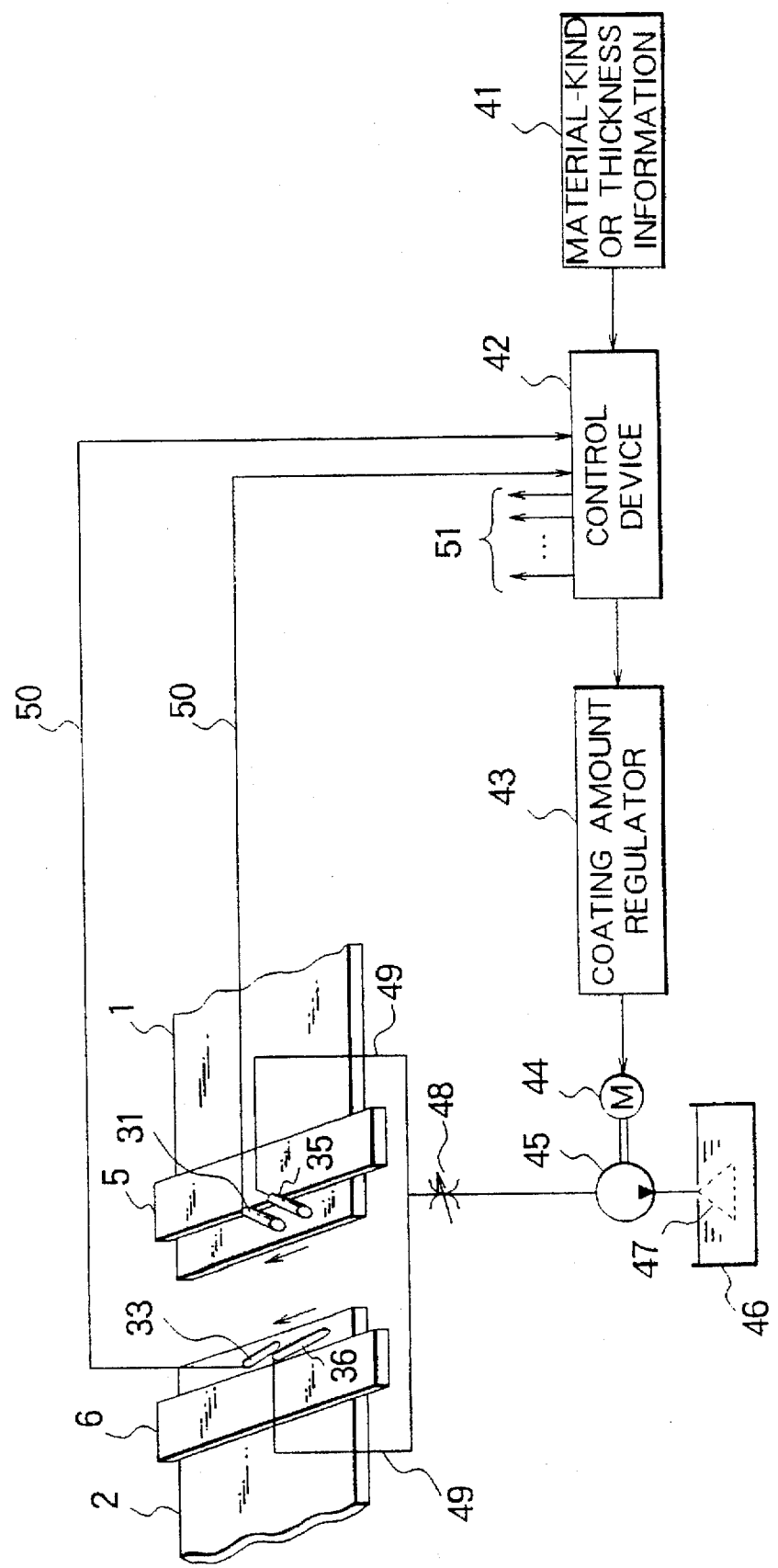
FIG. 3 is a view showing a combustible fluid coating system used in the first embodiment.

FIG. 3 illustrates the construction of the combustible fluid coating system as used with the aforementioned first embodiment. In this figure, the combustible fluid coating system includes a control device 42 in the form of a welding control computer which stores a table indicating the presence or absence of coating of a combustible fluid, the amount of coating as required, as well as various kinds of information such as the quality, thickness, width, etc., of welded materials which have been input to a higher-end computer. The control device 42 further stores another table relating to flash-welding margins, upset margins, flash time, upset times, etc. FIG. 4 shows an example of such a coating table for a combustible fluid. As shown in this table, in the case of low and high carbon steel, no coating is required. In the case of silicon steel, coating is based on the content of silicon. Thus, when the silicon content in weight percentage is in the range of from 0.5 to 1.5%, coating is carried out. When the thickness of a steel plate is less than 3 mm, oil is coated on the weld member at a rate of 2 cc per widthwise length of 100 mm, and when the steel plate thickness is equal to or greater than 3 mm, oil coating is effected at a rate of 4 can per widthwise length of 100 mm. The leading end and the trailing end of the weld member as sensed by the first sensor 31 and the second sensor 33, respectively, are input to the control device 42.

A coating amount regulator 43 determines, based on a control signal from the control device 42, whether there exits a coating or not, i.e., the presence or absence of the need for actuating a variable speed motor 44 (on/off control), and it controls the amount of coating fluid required, i.e., the rotational speed of the motor 44. When the variable speed motor 44 is driven to operate, the pump 45 is thereby operated to eject the combustible fluid stored in a tank 46 through a filter 47, the oil thus ejected being supplied to the nozzles 35, 36 by way of a throttle valve 48 and pipes 49, 49 so as to be coated on the end surfaces of the preceding weld member 1 and the following weld member 2. The combustible fluid may be oil, grease or the like. An example of oil is turbine oil, and an example of grease is lithium-type grease. In case of grease, coated grease is hard to flow down as droplets or drop naturally, thus avoiding worsening of environments for surrounding equipment. The pipes 49, 49 through which the combustible fluid passes and signal lines or wires 50, 50 extending from the first and second sensors 31, 33 are arranged along and held by the first and second support arms 32, 32 and the carriage 28 so as to be moved together therewith. Signal lines or wires 51 extends from the control device 42 for conveying various kinds of signals output therefrom during welding of the first and second weld members 1, 2.

Figure 5:
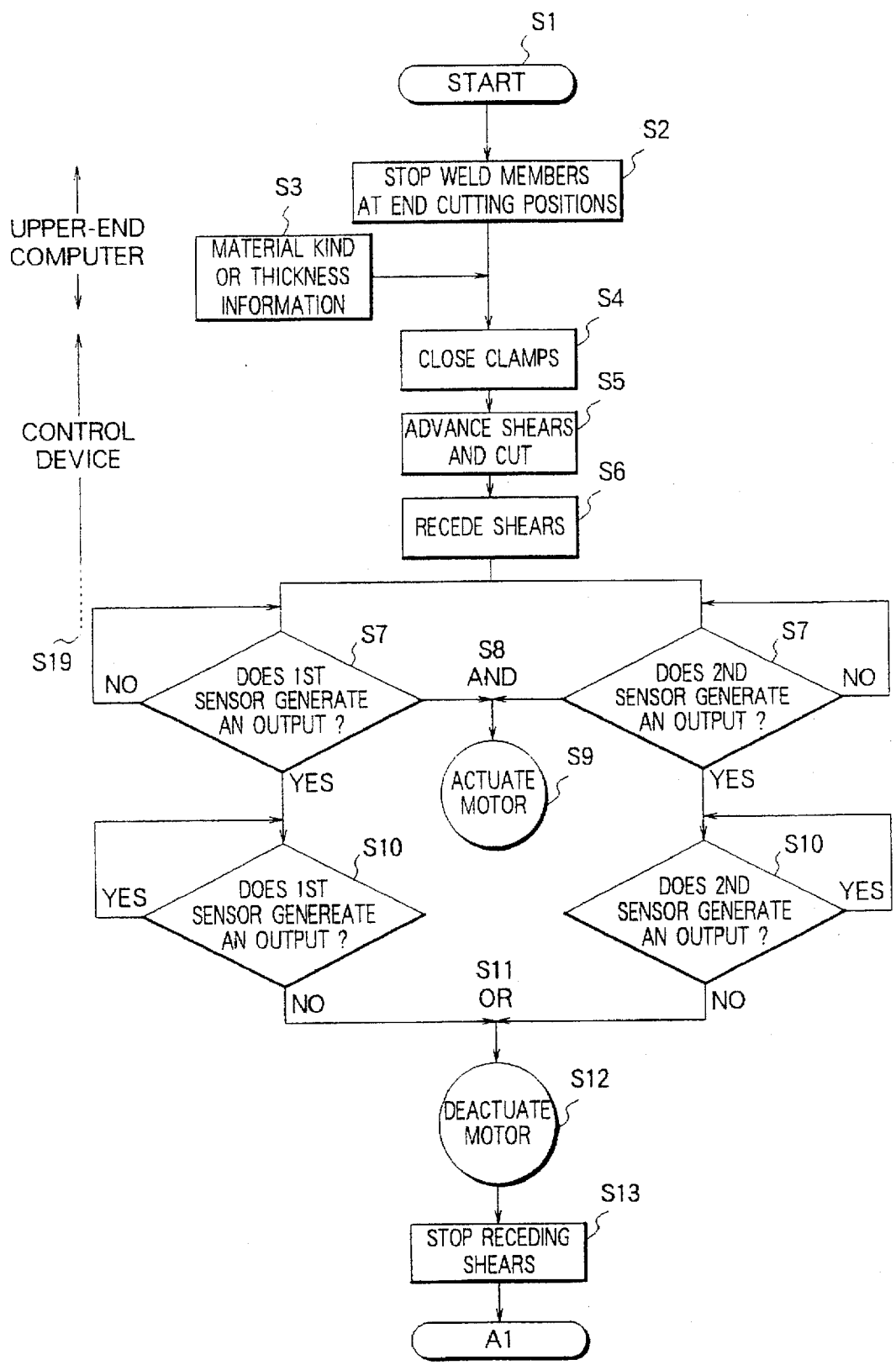
FIG. 5 is a flowchart showing a series of first steps of the operation of the flash welding machine according to the first embodiment.
Figure 6:
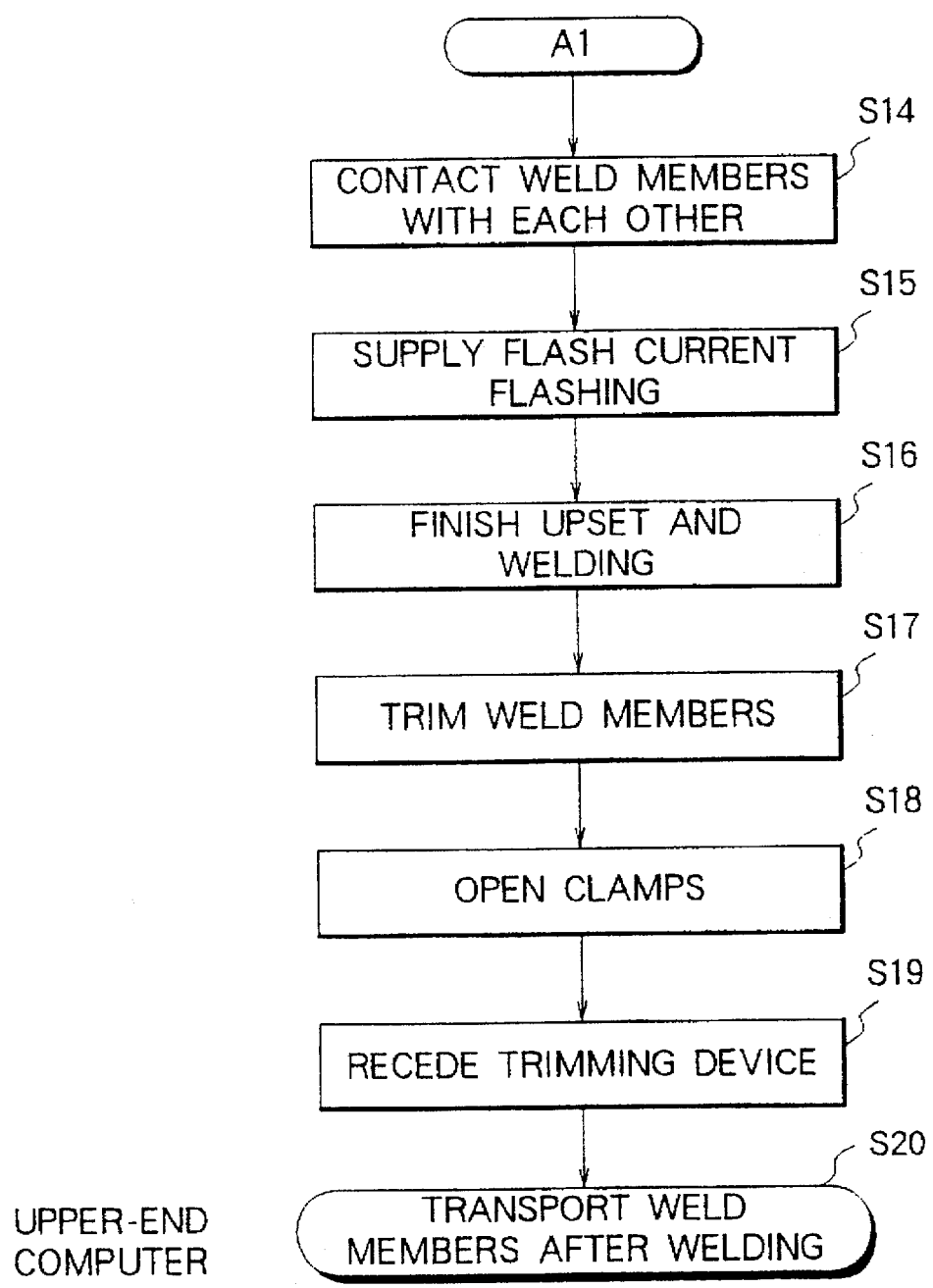
FIG. 6 is a flowchart showing a series of following steps of the flash welding machine operation.

Now, the operation of the flash welding machine constructed in accordance with the aforementioned embodiment will be described while referring to flowcharts of FIGS. 5 and 6. When line drive control is started by the unillustrated higher-end line drive control computer (S1), the preceding and following weld members 1, 2 are transferred to the predetermined end-cutting positions with their one ends disposed in a face-to-face relation with respect to each other under the control of the control device 42 (S2). The upper-end computer sends to the control device 42 information about the kind or thickness of materials for the weld members 1, 2 (S3). Subsequently, the following steps S4 through S19 are controlled by the control device 42 which constitutes the welding control computer. The preceding weld member 1 is clampingly held by the first clamp 5 and the first electrode 3, and the following weld member 2 is clampingly held by the second clamp 6 and the second electrode 4 (S4). The carriage 28 for the exit and entrance guillotine shears 26, 27 is advanced to such a position that the adjacent trailing and leading ends, respectively, of the preceding and following weld members 1, 2 are placed at locations between the upper and lower blades of the exit and entrance guillotine shears 26, 27, which are subsequently driven to cut these ends, allowing cut scraps to fall therefrom (S5).

Figure 7:
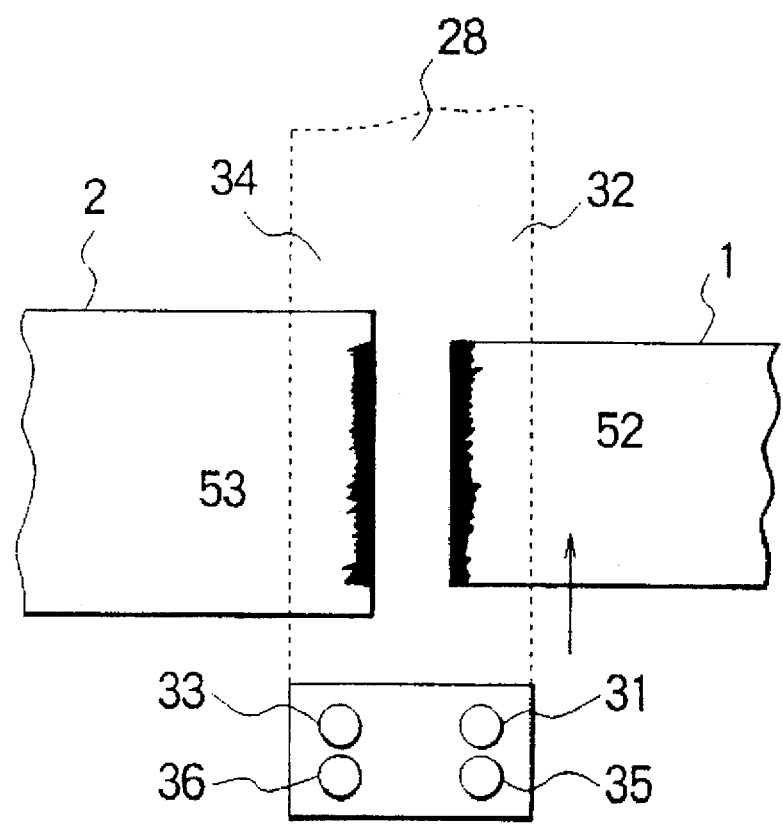
FIG. 7 is a view showing a combustible fluid coating operation.

The carriage 28 for the exit and entrance guillotine shears 26, 27 is driven to recede, while at the same time initiating coating of the combustible fluid (S6). FIG. 7 shows the combustible fluid coating operation in which the most portions of the first and second support arms 32, 34 are shown by broken lines. In this case, since the carriage 28 is receding (i.e., moving in the arrow direction in FIG. 7), the first and second end sensors 31, 33 respectively mounted on the tip ends of the first and second carriage support arms 32, 34 reach the leading ends of the preceding and following weld members 1, 2 earlier than the first and second coating nozzles 35, 36 do, and they generate leading-end-sensing outputs to the control device 42 (S7). In this case, when either one (e.g., the second sensor 33 in FIG. 7) of the first and second end sensors 31, 33 first senses one of the widthwise leading ends and then the other end sensor (e.g., the first sensor 31 in FIG. 7) senses the other widthwise leading end (S8) (i.e., when one of the sensors 31, 33 senses the later one of the widthwise leading ends), the control device 42 drives the variable speed motor 44 through the coating amount regulator 43 at such a time that the first and second coating nozzles 35, 36 can start coating from positions at which the adjacent longitudinal ends of the preceding and following weld members 1, 2 oppose to each other, i.e., from positions corresponding to the later one of the widthwise leading ends of the preceding and following welded members 1, 2. Such a point or time for actuating the variable speed motor 44 can be determined based on the widthwise feeding speed of the preceding and following welded members 1, 2 and the distances between the first sensor 31 and the first nozzle 35 and between the second sensor 33 and the second nozzle 36. If there develops a situation that the first and second coating nozzles 35, 36 are not fully filled with the combustible fluid at the time of starting the next coating operation subsequent to the preceding one, the variable speed motor 44 is actuated accordingly earlier so that oil coating can be performed from positions at which the adjacent ends of the preceding and following weld members 1, 2 oppose to each other. In this case, the motor 44 may be a normally operated constant-speed motor, and the control device 42 may regulate the amount of fluid ejected from each nozzle by switching the on/off operation of a flow control valve (not shown) or controlling the degree of opening thereof.

Thereafter, the first and second end sensors 31, 33 reach the trailing ends of the preceding and following weld members 1, 2 and generate trailing-end sensing outputs to the control device 42 (S10). In this case, when either one (e.g., the first sensor 31 in FIG. 7) of the first and second end sensors 31, 33 senses one of the widthwise trailing ends (e.g., the trailing end of the preceding welded member 1 (S11), the control device 42 stops the variable speed motor 44 through the coating amount regulator 43 at such a time that the first and second coating nozzles 35, 36 stop coating at positions corresponding to the earlier one of the widthwise trailing ends of the preceding and following weld members 1, 2 (S12). Such a point or time for stopping the variable speed motor 44 can be determined based on the widthwise feeding speed of the preceding and following welded members 1, 2 and the distances between the first sensor 31 and the first nozzle 35 and between the second sensor 33 and the second nozzle 36. Here, it is to be noted that reference numerals 52, 53 represent those portions of the preceding and following weld members 1, 2 to which the combustible fluid is to be coated, those portions being later placed in abutting engagement with each other so as to be welded together. In this connection, it is preferred that coating of the combustible fluid be effected over an area slightly greater than those portions of the weld members 1, 2 which are abutted and welded with each other, thereby ensuring valid coating over the entire welding areas thereof. The coating of the combustible fluid can be carried out through natural dropping, spraying, injection, brushing or the like. The coating can also be effected on the underside surfaces of the trailing and leading ends of the weld members 1, 2 as well as the upperside surfaces thereof.

Thus, the combustible fluid coating operation is terminated and the carriage 28 for the exit and entrance guillotine shears 26, 27 is receded to its original position and the receding movement is ceased there (S13). Here, it is to be noted that if it is determined on the basis of information 41 on the kind of material that the weld members are formed of a material such as low carbon steel requiring no oil coating, coating of the combustible fluid is not of course carried out.

The second or following weld member 2 clamped by the second clamp 6 and the second electrode 4 with both the first and second electrodes 3, 4 supplied with voltage is moved by means of the cylinder 24 toward the preceding weld member 1 to such an extent as to come at its longitudinal leading end into slight contact with the longitudinal trailing end of the preceding welded member 1 (S14), whereupon a current flows between the first and second electrodes, causing flashing (S15). At this instant, the combustible fluid coated on the weld members 1, 2 fires to burn so that welding proceeds in an irrespirable atmosphere. Thereafter, the second or following weld member 2 further advances to complete the welding through an upset process (S16).

The welded portions are trimmed by an unillustrated trimming device (S17), and the first and second clamps 5, 6 are then released, returning the unillustrated trimming device to its original position (S19). At this moment, the control device 42 in the form of the welding control computer finishes its control operation. Thereafter, the weld members 1, 2 thus having being welded are conveyed to an appropriate place under the control of the upper-end computer (S20).

Here, it is to be noted that if the amount of combustible fluid to be coated is insufficient, it becomes impossible to maintain the irrespirable atmosphere until the finishing of the welding operation, whereas the combustible fluid amount is excessive, the combustible fluid flows down or drops naturally, worsening environmental conditions around the equipment. According to the abovementioned first embodiment, however, coating of the combustible fluid is controlled to a suitable amount based on the information about the kind of materials used for the weld members by means of the control device 42 having the coating table.

In the above description, when the exit and entrance guillotine shears 26, 27 recede or move in the backward direction after cutting of the ends of the preceding and following weld members 1, 2, the combustible fluid is coated on the cut end surfaces thereof, but such coating can be effected when the exit and entrance guillotine shears 26, 27 advance or move in the forward direction prior to the cutting of the ends of the preceding and following weld members 1, 2. In this case, the first and second coating nozzles 35, 36 and the first and second end sensors 31, 33 are sequentially mounted on the end portions of the first and second support arms 32, 34 in this order toward the tip end edges thereof so that the first and second end sensors 31, 33 can reach the widthwise leading and trailing ends of the preceding and following weld members 1, 2 earlier than the first and second nozzles 35, 36 do.

EMBODIMENT 2

Although in the aforementioned first embodiment, the exit and entrance guillotine shears 26, 27 are employed for cutting the preceding and following weld members 1, 2, a rotary shear device can instead be used for the same purpose.

Figure 8:
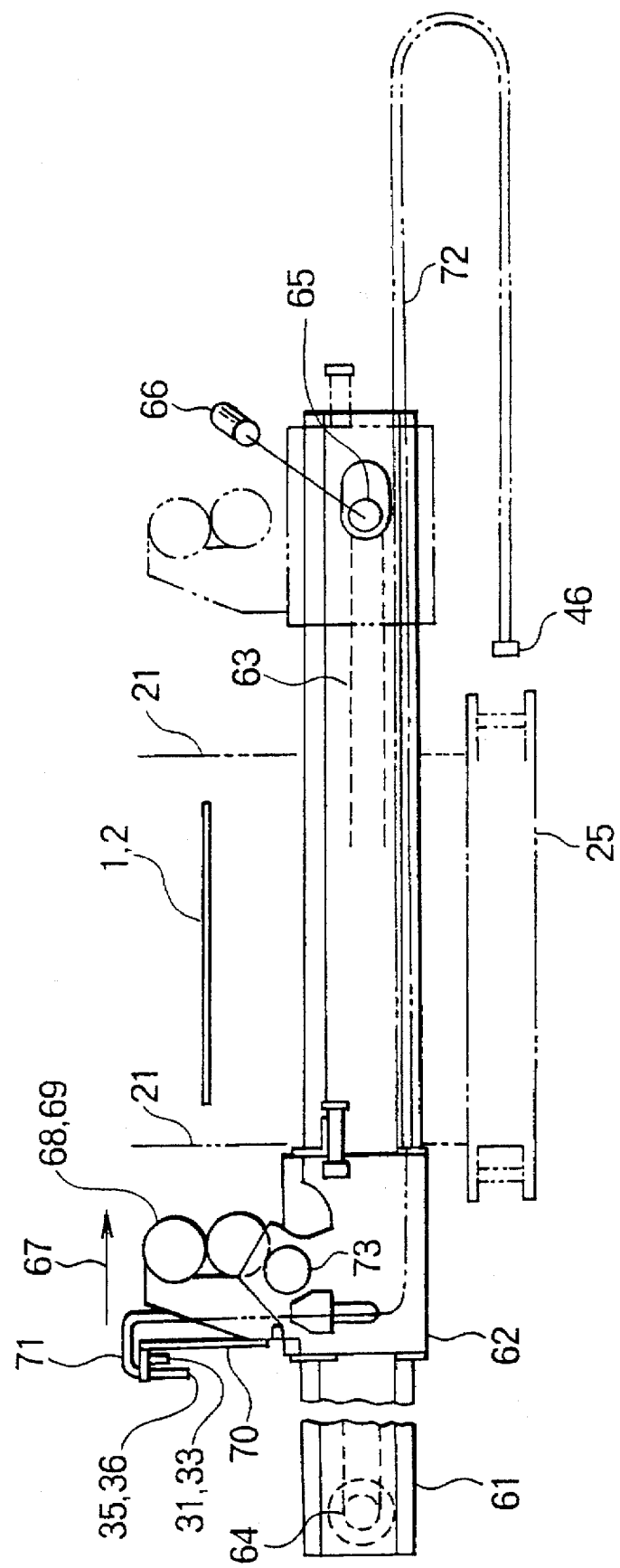
FIG. 8 is a view showing the construction of a rotary shear device used with a second embodiment of the present invention.

FIG. 8 illustrates the construction of a rotary shear device 62 which is used, in place of the guillotine shears, with a second embodiment of the present invention which will be described later. This figure corresponds to FIG. 2 which illustrates the guillotine shears according to the first embodiment.

In FIG. 8, the rotary shear device 62 is movable back and forth on and along a rail 61 which is disposed under the preceding and following weld members 1, 2 at a location between the fixed supports 21, 21 and the movable supports 22, 22 in a direction perpendicular to the longitudinal direction of the preceding and following weld members 1, 2 in such a manner as to impede transportation of the preceding and following weld members 1, 2. The common base 25, the fixed supports 21, 21 mounted thereon, etc., are shown by phantom lines in the center of FIG. 8. The rotary shear device 62 is driven to move by means of a hydraulic motor 64 through the intermediary of a drive chain 63 with a rotation shaft 65 being rotated together with the movement of the drive chain 63, the number of revolutions per minute of the rotation shaft 65 being counted by an absolute encoder 66. An arrow mark 67 designates a forward direction in which the rotary shear device 62 advances.

The rotary shear device 62 is provided with an exit shear 68 in the form of a pair of rotary blades and an entrance shear 69 in the form of a pair of rotary blades. The rotary shear device 62 is further provided with a fixed support arm 70 on which a first nozzle 35 and a first end sensor 31 are sequentially and integrally mounted in this order in the advancing direction of the rotary shear device 62. Also, on the support arm 70, there are integrally mounted a second nozzle 36 and a second end sensor 33 sequentially in this order in the advancing direction of the rotary shear device 62. As in the case of the aforementioned first embodiment, the first end sensor 31 moves on and along the cut end surface of the preceding weld member 1 in the widthwise direction thereof, and at the same time the second end sensor 33 moves on and along the cut end surface of the following weld member 2 in the widthwise direction thereof.

Provision is made for a pipe 71 through which a combustible fluid passes, a paired cable 72 and an oil tank 46. The paired cable 72 carries output signal lines of the first and second end sensors 31, 33 along with the pipe 71 in accordance with the back and forth movements of the rotary shear device 62. The upper portions of the rotary shear device 62 including the exit and entrance shears 68, 69 and the support arm 70 are rotatable about a rotation shaft 73 to a laid-down or horizontal position or an upright or vertical position for adjustment of their height.

Figure 9:
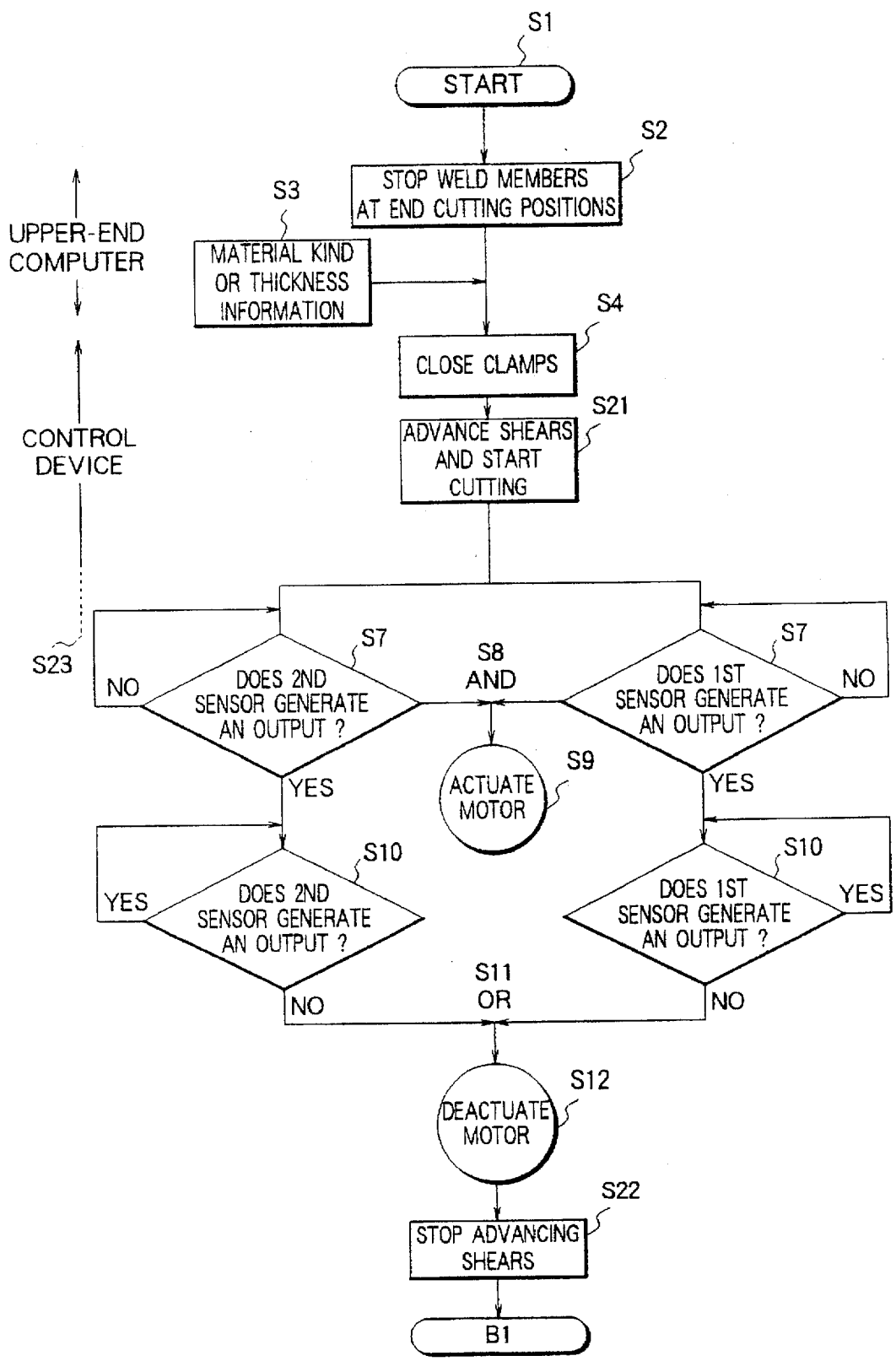
FIG. 9 is a flowchart showing a series of first steps of the operation of a flash welding machine according to the second embodiment.

Now, the operation of the flash welding machine as constructed above in accordance with the second embodiment of the present invention will be described below with respect to flowcharts of FIGS. 9 and 10. In these figures, steps S1 through S4 are the same as those of the aforementioned first embodiment. Steps S1 through S3 are controlled by the unillustrated upper-end computer, whereas steps S4 through S23 are controlled by the control device 42 in the form of the welding control computer. When the rotary shear device 62 is caused to advance, the exit and entrance shears 68, 69 operate to chew and cut the preceding and following weld members 1, 2 (S21). At the same time, the first and second end sensors 31, 33 respectively reach the widthwise leading ends of the preceding and following weld members 1, 2 earlier than the first and second coating nozzles 35, 36 do, so that they generate leading-end detection outputs to the control device 42 (S7). At this time, when either one of the first and second end sensors 31, 33 senses one of the widthwise leading ends after the other sensor sensed the other widthwise leading end (S8), the control device 42 actuates the variable speed motor 44 through the intermediary of the coating amount regulator 43 at such a time that the first and second coating nozzles 35, 36 start coating the combustible fluid on the cut ends of the preceding and following welded members 1, 2 from positions corresponding to the later detected one of the widthwise leading ends thereof (S9).

Thereafter, when the first and second end sensors 31, 33 reaches the trailing ends of the preceding and following weld members 1, 2, they generate trailing-end detection outputs to the control device 42 (S10). At this time, if either one of the first and second end sensors 31, 33 senses one of the trailing ends of the preceding and following weld members 1, (S11), the control device 42 stops driving the variable speed motor 44 through the intermediary of the coating amount regulator 43 at such a time that the first and second coating nozzles 35, 36 stop coating at positions corresponding to the earlier detected one of the trailing ends of the preceding and following weld members 1, 2 (S12).

Thus, the combustible fluid coating operation is finished, whereupon the rotary shear device 62 having been continuing to advance is stopped at a location further away from the widthwise trailing ends of the preceding and following weld members 1, 2.

Figure 10:
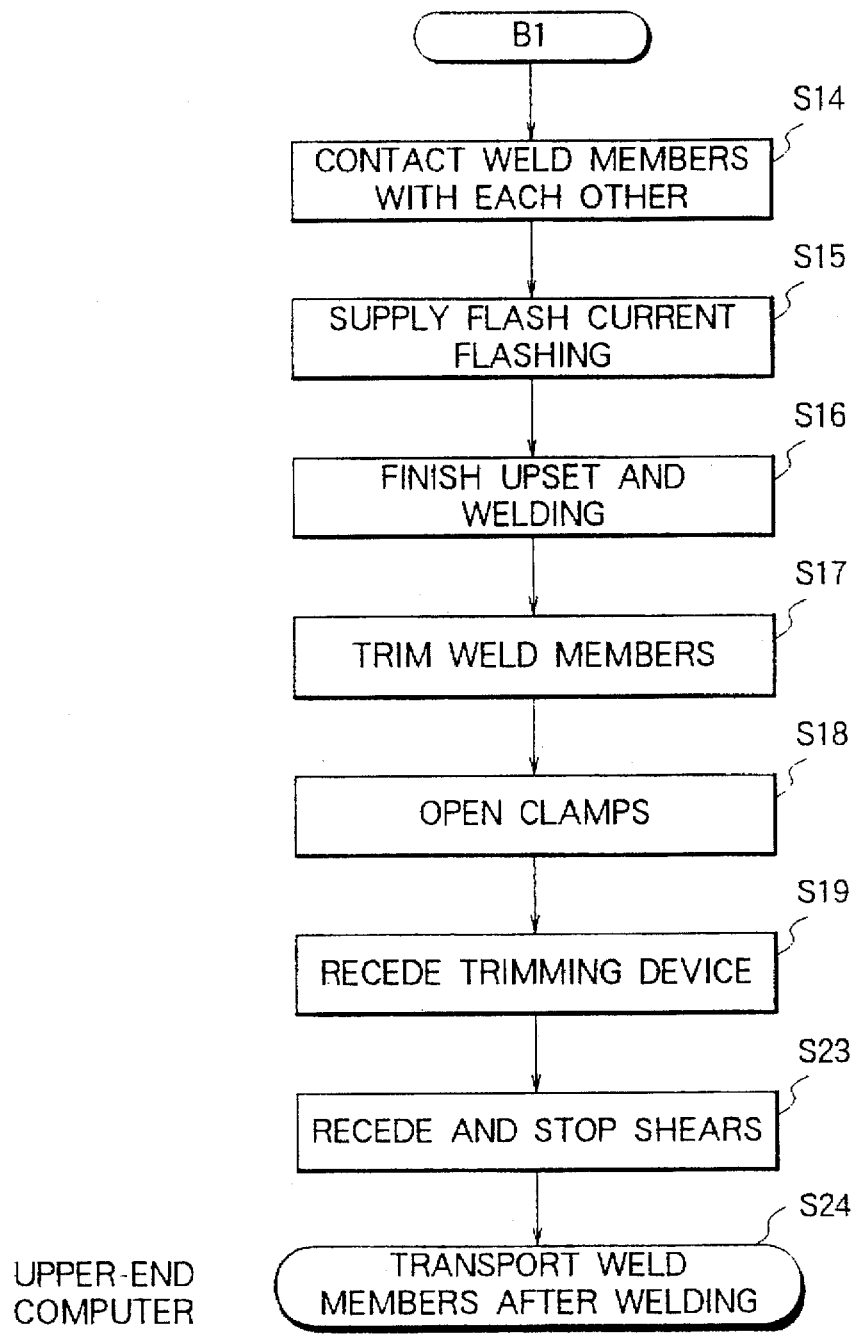
FIG. 10 is a flowchart showing a series of following steps of the flash welding machine operation according to the second embodiment.
Figure 11:
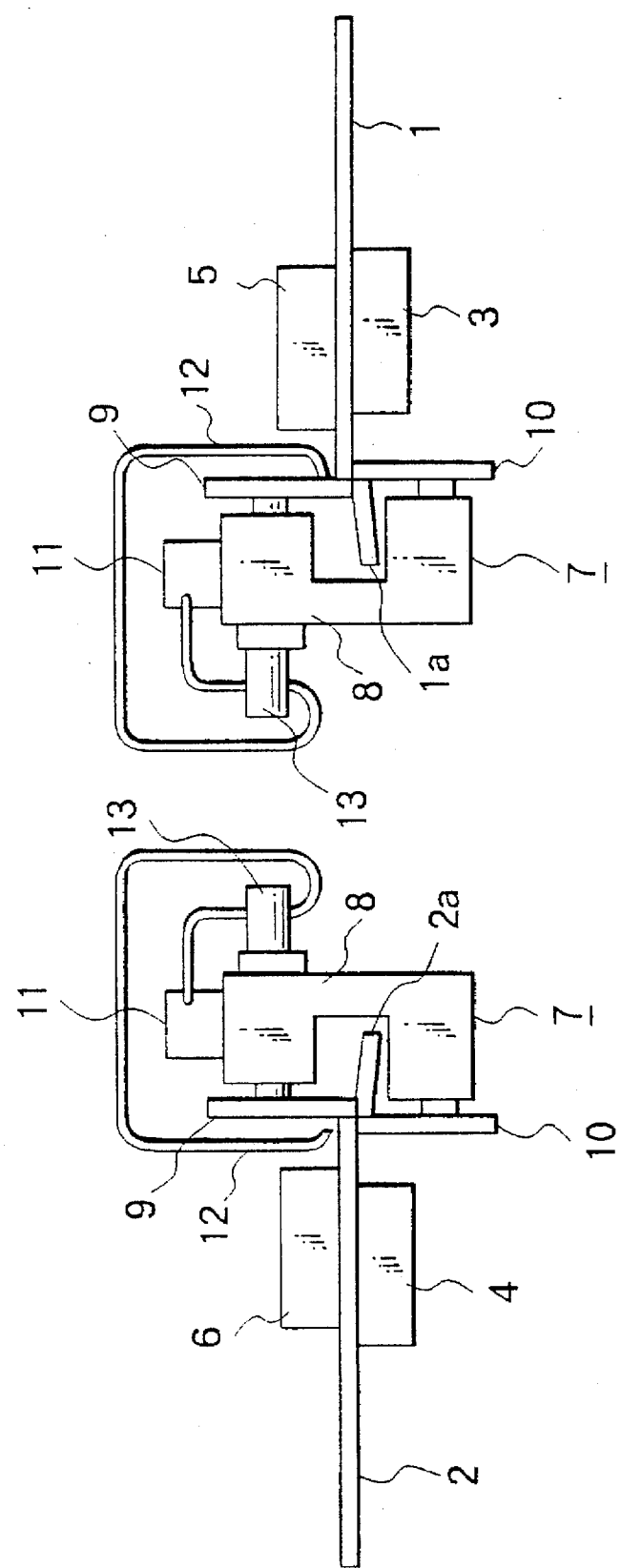
FIG. 11 is a view showing a conventional flash welding machine.

Thereafter, Steps S14 through S19 in FIG. 10 are carried out which are the same as those of the aforementioned first embodiment. After Step S19, the upper portions of the rotary shear device 62 are caused to rotate to a laid-down position thereof about the rotation shaft 73 to take a low posture (see FIG. 8), so that the rotary shear device 62 can be caused to recede to the original position while passing under the preceding and following weld members 1, 2 (S23). At the original position, the rotary shear device 62 is stopped with its upper portion being moved to the upright position. At this time, the control operation of the control device 42 finishes, after which the preceding and following weld members 1, 2 are transported to an appropriate place under the control of the unillustrated upper-end computer (S24).

EMBODIMENT 3

Although in the aforementioned first embodiment, the carriage 28 carrying thereon the exit and entrance guillotine shears 26, 27 and the first and second end sensors 31, 33 attached thereto are movable between the fixed supports 21 and the movable supports 22, 22, a single guillotine shear (i.e., one of the exit and entrance guillotine shears 26, 27) can be mounted on a station or carriage which is disposed rearwardly of the movable supports 22, 22 at a location outside a space between the fixed supports 21, 21 so that it can cut the trailing end of the preceding weld member 1 which is then coated with a combustible fluid before the trailing end reaches the space between the fixed supports 21, 21 and the movable supports 22, 22. Thereafter, the trailing end of the preceding weld member 1 thus cut and coated is moved into the space between the fixed supports 21, 21 and the movable supports 22, 22. Further, before the leading end of the second or following weld member 2 reaches the space between the fixed supports 21, 21 and the movable supports 22, 22, it is cut by the one guillotine shear and coated with the combustible fluid. Thereafter, the leading end of the second or following weld member 2 thus cut and coated is passed through the space between the fixed supports 21, 21 and the movable supports 22, 22. Then, the preceding and following weld members 1, 2 are placed in contact with each other and welded together in an irrespirable atmosphere. In this manner, a single guillotine shear can be advantageously utilized for the exit and entrance guillotine shears. This can also be applicable in the case of the rotary shear device, that is, a single rotary shear can be similarly utilized for both the exit and entrance rotary shears.

As described above, the present invention provides the following advantages.

According to the flash welding machine of the present invention, in the course of cutting the ends of a pair of preceding and following weld members by a shear means followed by flash welding thereof, a coating means can start coating a combustible fluid on the cut ends of the weld members from widthwise leading ends of the weld members after detection thereof by a sensor means, and stop coating at widthwise trailing ends of the weld members after detection thereof by the sensor means prior to the welding thereof, so that the combustible fluid can be coated over the whole range from the widthwise leading ends to the widthwise trailing ends of the weld members, while reducing excessiveness or shortage in coating.

Further, the coating means comprises a nozzle provided each weld member for coating the combustible fluid while moving in the widthwise direction of the weld members, and the sensor means comprises an end sensor provided for each weld member and integrally mounted on the nozzle at a location forwardly thereof in the direction in which the nozzle moves in the widthwise direction of the weld members. With this arrangement, the nozzle can perform coating of the combustible fluid after the end sensor has sensed the widthwise leading and trailing ends of the weld members.

Since the nozzle and the end sensor are mounted on the shear means, a carriage for supporting the shear means is also utilized to carry the nozzle and the end sensor thereon.

Moreover, if the shear means for cutting ends of the weld members, the end sensor and the coating nozzle are utilized in common for the preceding and following weld members, the entire equipment becomes simple, thus reducing the cost of manufacture.

If the combustible fluid comprises grease, it is possible to suppress natural dropping or flow-down of the combustible fluid from a coating pipe to a minimum. Furthermore, the sensor means can comprise end sensors for respectively sensing the widthwise leading and trailing ends of the preceding weld member and the widthwise leading and trailing ends of the following weld member, so that the combustible fluid begins to be coated on the end surfaces of the weld members when these sensors all sense the widthwise leading ends of the preceding and following weld members, whereas coating of the combustible fluid on the end surfaces is stopped when either one of the end sensors senses one of the widthwise trailing ends of the preceding and following weld members. With this arrangement, oil coating is effected from the widthwise leading end of the preceding or following weld member which opposes to the other weld member (i.e., the later or last detected leading end), and stopped at the widthwise trailing end of the preceding or following weld member which opposes to the other weld member (i.e., at the earlier or first detected widthwise trailing end).

Still further, since provision can be made for a control means which determines, based on input information about the kind of a material for the weld members, whether coating of a combustible fluid is required for the material, coating is avoided for the weld members on which it is unnecessary to coat a combustible fluid.

In addition, the control means can adjust the amount of combustible fluid to be coated on the basis of the material kind information input thereto, so that the combustible fluid can be coated with a more appropriate amount.

What is claimed:

1. A flash welding machine comprising:

shear means for cutting an end of each of a pair of preceding and following weld members, each of said weld members having a widthwise leading end and a widthwise trailing end;

sensor means for sensing a widthwise leading end and a widthwise trailing end of each of said weld members; and coating means for coating a combustible fluid on the cut ends of said weld members, said coating means being adapted to start coating from the widthwise leading ends of said weld members when said sensor means senses the widthwise leading ends of said weld members, and stop coating when said sensor means senses the widthwise trailing ends of said weld members.

2. The flash welding machine as claimed in claim 1, wherein said coating means comprises a nozzle provided for each weld member and movable in a widthwise direction of the corresponding weld member, and wherein said sensor means comprises an end sensor provided for each weld member and disposed integrally with said nozzle at a location forwardly of the corresponding nozzle in a direction in which said nozzle moves in the widthwise direction of the corresponding weld member.

3. The flash welding machine as claimed in claim 1, wherein said coating means and said sensor means are mounted on said shear means.

4. The flash welding machine as claimed in claim 1, wherein said shear means, said sensor means and said coating means are utilized in common for said weld members.

5. The flash welding machine as claimed in claim 1, wherein said combustible fluid comprises grease.

6. The flash welding machine as claimed in claim 1, wherein said sensor means comprises:

a first sensor for sensing the leading and trailing ends of said weld members; and a second sensor for sensing the leading and trailing ends of said weld members;

wherein said coating means is operable to start coating said combustible fluid on the cut surfaces of said weld members when both of said first and second sensors sense the widthwise trailing ends of said weld members, and stop coating when either one of said first and second sensors senses the widthwise trailing end of one of said weld members.

7. The flash welding machine as claimed in claim 1, further comprising control means which determines, based on information about the kind or thickness of a material of said weld members input thereto, whether coating of a combustible fluid is required for the material.

8. The flash welding machine as claimed in claim 7, wherein said control means adjusts an amount of combustible fluid to be coated on the basis of the material kind or thickness information input thereto.

* * * * *